(12) United States Patent
Uehara

(10) Patent No.: US 7,573,656 B2
(45) Date of Patent: Aug. 11, 2009

(54) LENS BARREL

(75) Inventor: Takumi Uehara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 11/830,119

(22) Filed: Jul. 30, 2007

(65) Prior Publication Data

US 2008/0037144 A1    Feb. 14, 2008

(30) Foreign Application Priority Data

Jul. 31, 2006  (JP) .............................. 2006-208648

(51) Int. Cl.
*G02B 7/02* (2006.01)
(52) U.S. Cl. ...................... 359/811; 359/819
(58) Field of Classification Search .................. 359/811, 359/813, 814, 819, 821, 823
See application file for complete search history.

(56) References Cited

U.S. PATENT DOCUMENTS 6,439,727 B1 *  8/2002  Koide .......................... 359/511

FOREIGN PATENT DOCUMENTS

| JP | 06-067261 | 3/1994 |
|---|---|---|
| JP | 07-159856 | 6/1995 |

\* cited by examiner

*Primary Examiner*—Timothy J Thompson
(74) *Attorney, Agent, or Firm*—Cowan, Liebowitz & Latman, P.C.

(57) ABSTRACT

A lens barrel which is capable of attaining further reduction of thickness and size of a lens barrel by making effective use of accommodation spaces for barrier blades. In the lens barrel, barrier blades openably covers an image-taking by changing over its position between an image-taking position and a standby position. Accommodation spaces receive the barrier blades therein, respectively, when they are open. When the lens barrel is switched from the image-taking position to the standby position, a rectilinearly-moving restriction barrel relatively moves closer to the barrier blades in an optical axis direction, and at this time, arch-shaped portions of the rectilinearly-moving restriction barrel enter the accommodation spaces.

8 Claims, 9 Drawing Sheets

LENS BARREL

BACKGROUND OF THE INVENTION

1. Field of the Invention

The present invention relates to a lens barrel which is provided with barrier blades disposed in the front of a photographic optical system, for protecting a photographic lens and openably covering an image-taking.

2. Description of the Related Art

A conventional lens barrel of the above-mentioned type is disclosed e.g. in Japanese Laid-Open Patent Publication (Kokai) No. H07-159856.

The lens barrel is provided with a pair of barrier blades for openably covering an image-taking formed in the front of a photographic optical system, and the barrier blades are opened and closed by a barrier drive ring that rotates about the optical axis. A rotational force of a rotational barrel is transmitted to the barrier drive ring via a connecting shaft.

A barrier-closing spring is mounted between each of the barrier blades and the barrier drive ring. The barrier-closing spring always holds the associated barrier blade in contact with the barrier drive ring in a manner urging the barrier blade in the closing direction to thereby accommodate or absorb the motion of the barrier drive ring in a direction away from the barrier blades.

Further, between the barrier drive ring and a lens barrel cover, there is mounted a barrier-opening spring that urges the barrier drive ring to drive each of the barrier blades in the opening direction.

When the rotational barrel rotates in one direction, the rotational force of the rotational barrel is transmitted to the barrier drive ring via the connecting shaft, and the barrier drive ring rotates in the one direction while charging the barrier-opening spring.

At this time, each of the barrier blades is pressed by the associated barrier-closing spring to turn in the other direction according to the rotation of the barrier drive ring. As a consequence, the barrier blades are closed to cover the image-taking in the front of the photographic optical system.

On the other hand, when the rotational barrel rotates in the other direction, the rotational barrel is unhooked from the connecting shaft, and the barrier drive ring is rotated in the other direction by the charged spring force of the barrier-opening spring.

At this time, the barrier blades turn in the other direction according to the rotation of the barrier drive ring. As a consequence, the barrier blades are opened to open the image-taking in the front of the photographic optical system. Then, when fully opened, the barrier blades come into abutment with respective stoppers, whereby the pivotal motion of each of the barrier blades is restrained to stop the rotation of the barrier drive ring.

By the way, in recent years, for reduction of the size or thickness of cameras, the reduction of the size of the lens barrel is demanded. However, it is conventionally required to dispose the barrier blades on the front side of components of the lens barrel or on the inner side of the same, so as to prevent the component parts from interfering with the barrier blades when the lens barrel is collapsed. This makes it necessary to provide accommodation spaces for the barrier blades, and hence it is difficult to reduce the size or thickness of the lens barrel.

As a solution to this problem, there has been proposed a lens barrel in which two barrier blades are caused to perform an opening operation in the same direction, so as to be received in a blade accommodation section formed in a portion of the lens barrel around the opening thereof, whereby a space for accommodating some or part of components of the lens barrel is formed on a side opposite to a side where the blade accommodation section is disposed, with respect to the optical axis (see e.g. Japanese Laid-Open Patent Publication (Kokai) No. 06-67261).

According to the proposal, it is stated that when the lens barrel is collapsed, by accommodating some or part of components of the lens barrel in the accommodation space on the side opposite to the side where the blade accommodation section for the barrier blades is disposed with respect to the optical axis, it is possible to make effective use of the accommodation space conventionally used for accommodating one of the barrier blades, and thereby attain reduction of the length of the lens barrel.

According to Japanese Laid-Open Patent Publication (Kokai) No. 06-67261, however, the space for accommodating the components of the lens barrel can only be formed on the side opposite to the side where the blade accommodation section for the barrier blades is disposed with respect to the optical axis. Further, since the two barrier blades are received in an overlapping manner when they are opened, the thickness of the blade accommodation section increases in the direction of the optical axis, which increases the collapsed lens barrel length.

SUMMARY OF THE INVENTION

The present invention provides a lens barrel which is capable of attaining further reduction of thickness and size of a lens barrel by making effective use of accommodation spaces for barrier blades.

The present invention provides a lens barrel comprising a barrier blade adapted to openably cover an image-taking aperture, the barrier blade being adapted to be moved in a storage space in an open state of the barrier blade corresponding to an image-taking position of the lens barrel, and a moving member including a leading end, the moving member being adapted to relatively move closer to the barrier blade in an optical axis direction when the barrier blade is switched from the open state corresponding to the image-taking position of the lens barrel to a closed state corresponding to a standby position of the lens barrel, whereby the leading end enters the storage space when the barrier blade is in the closed state.

With the arrangement of the present invention, by switching the position of the lens barrel from the image-taking position to the standby position, the leading end of the moving member that relatively move in the optical axis direction closer to the barrier blade enters the accommodation space in which the barrier blade is received during the open state of the barrier blade, when the barrier blade is closed. This makes it possible to make effective use of the accommodation space for the barrier blade.

The barrier blade comprise a plurality of barrier blades, and the storage space comprise a plurality of storage spaces provided in association with the barrier blades, respectively.

With this arrangement, it is not required to receive a plurality of barrier blades in the open state in an overlapping manner, either, and hence it is possible to reduce the thickness of each accommodation space in the optical axis direction. Therefore, it is possible to attain further reduction of the thickness and size of the lens barrel.

The lens barrel includes a barrier drive member adapted to move between an opening position and a closing position to drivingly open and close the barrier blade, to thereby switch the lens barrel between the image-taking position and the standby position, and when the barrier drive member moves from the opening position to the closing position, the barrier drive member is brought into contact with the barrier blade before the moving member is brought into contact with the barrier blade, to thereby drive the barrier blade in a closing direction.

The moving member includes a leading end that is brought into contact with the barrier blade in the open state to thereby drive the barrier blade in a closing direction, when the lens barrel is switched from the image-taking position to the standby position.

The lens barrel is a retractable lens barrel that is driven by an electric motor.

The moving member is a linear guide member that guides a lens group in the optical axis direction when the lens group is driven for zooming or focusing.

The guide member is a guide bar.

The leading end of the moving member and a corresponding portion of the blade member with which the leading end is brought into contact are formed with tapered surface, respectively.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
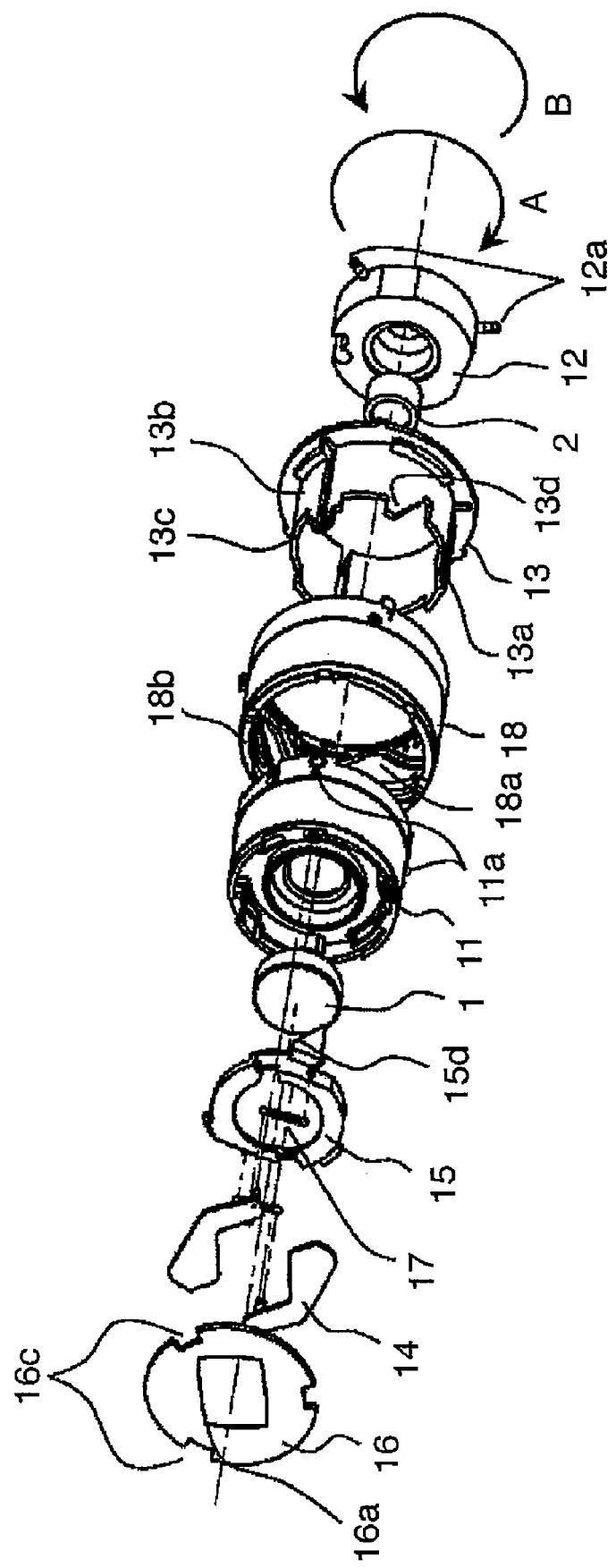
FIG. 1 is an exploded perspective view of a lens barrel assembly including a lens barrel according to a first embodiment of the present embodiment.
Figure 2:
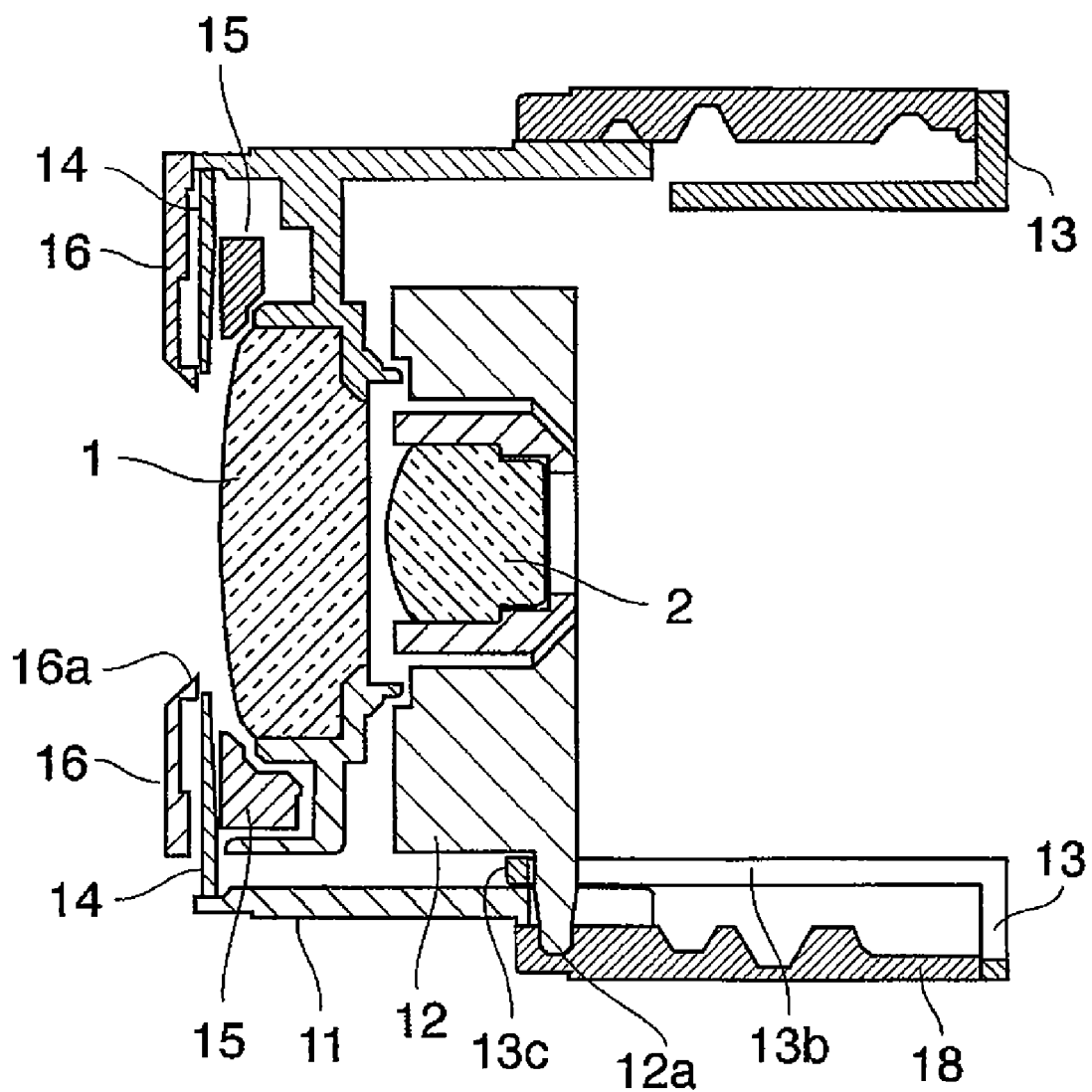
FIG. 2 is a cross-sectional view of the lens barrel assembly in an image-taking position.
Figure 3:
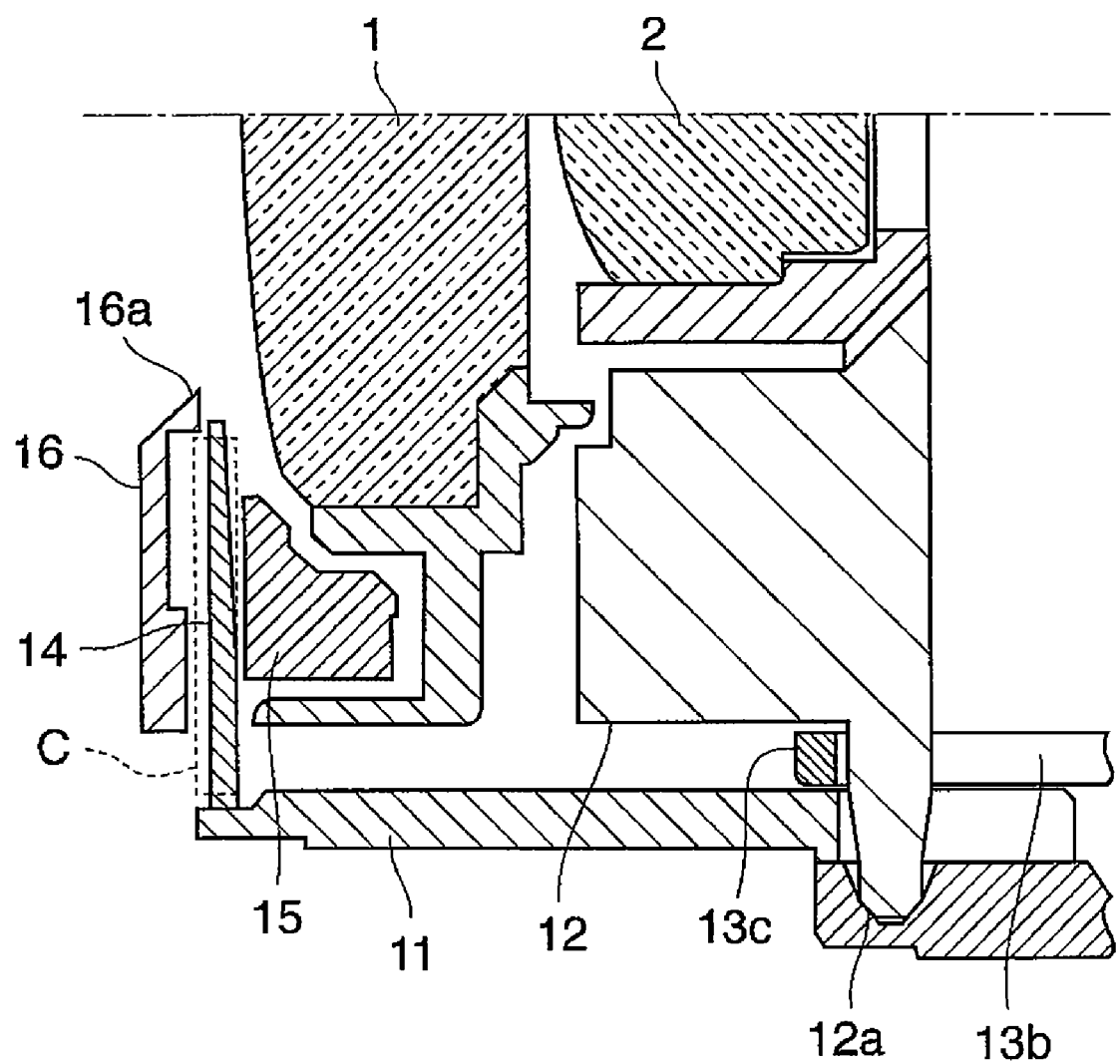
FIG. 3 is a partial enlarged view of FIG. 2.
Figure 4:
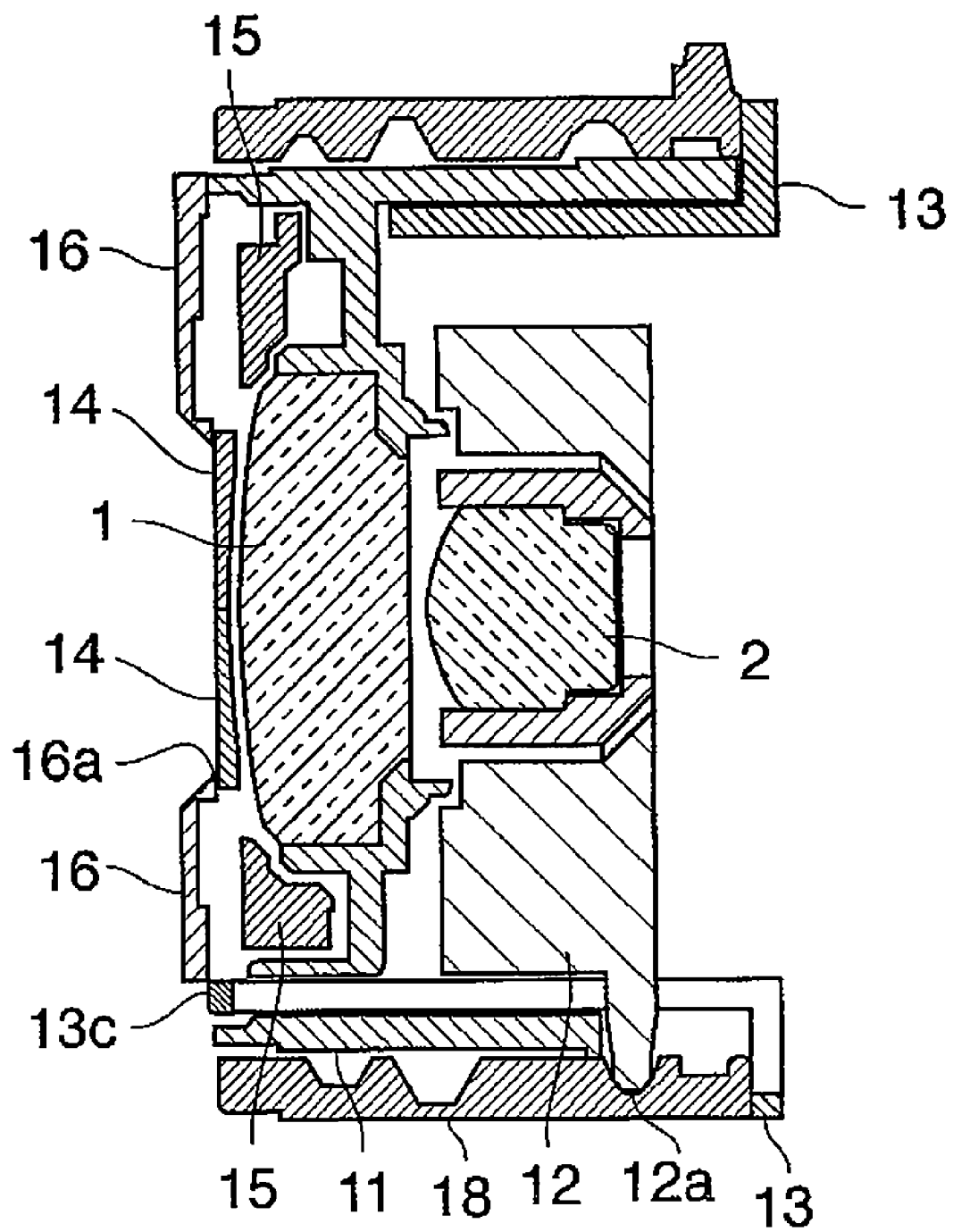
FIG. 4 is a cross-sectional view of the lens barrel assembly in a collapsed (standby) position.
Figure 5:
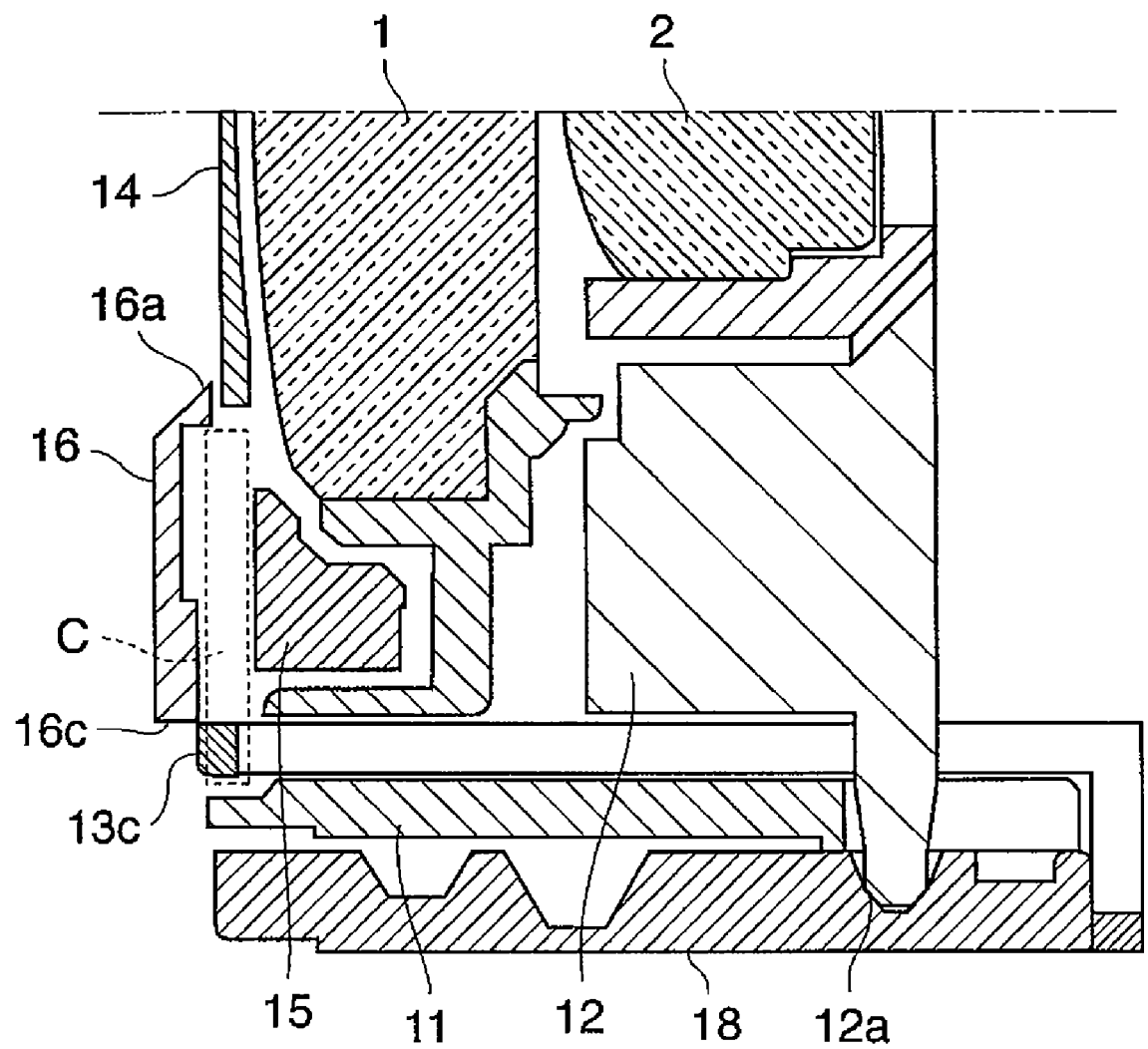
FIG. 5 is a partial enlarged view of FIG. 4.
Figure 6:
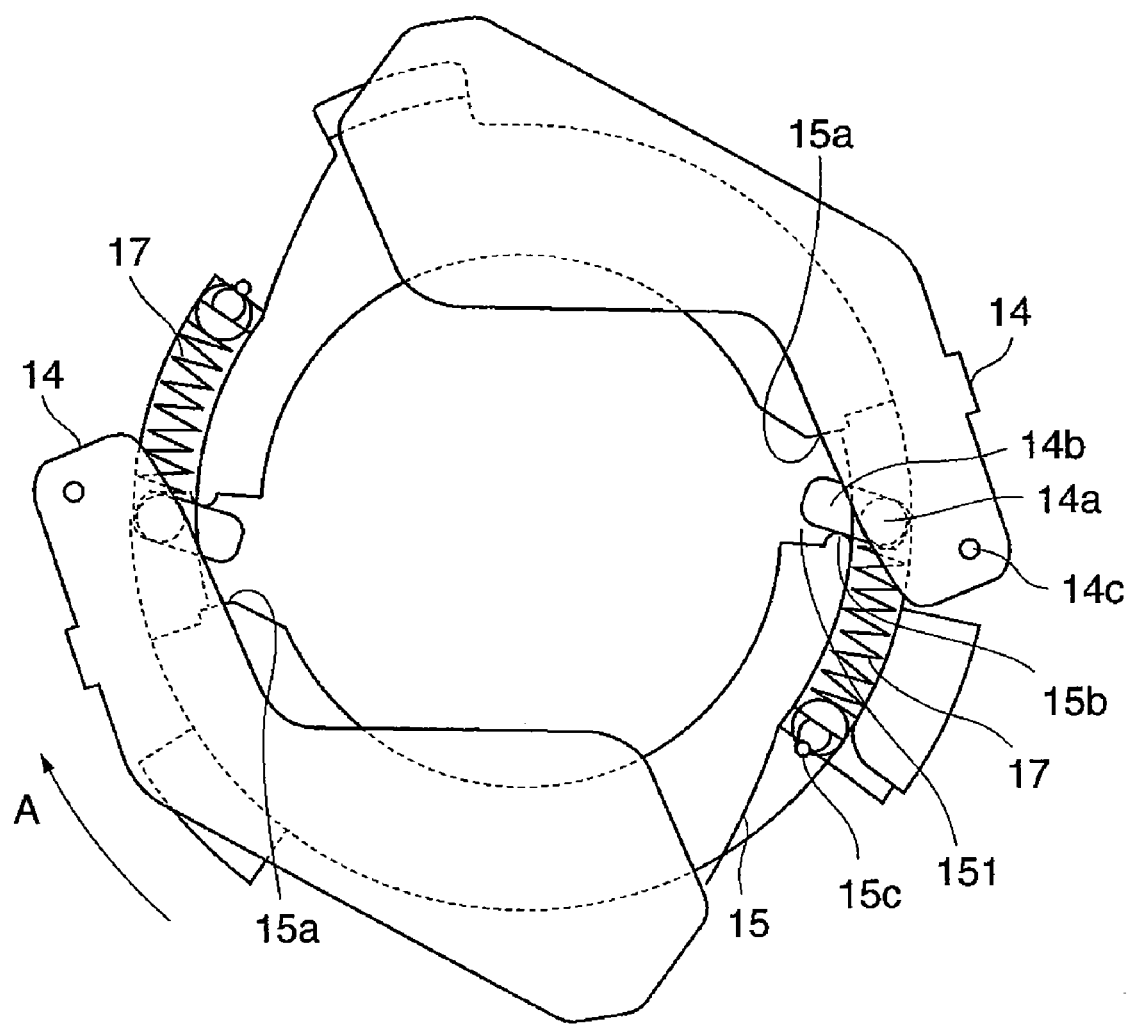
FIG. 6 is a view of the barrier blades in a state sticking to an open position due to presence of foreign matter during closing operation thereof.
Figure 7:
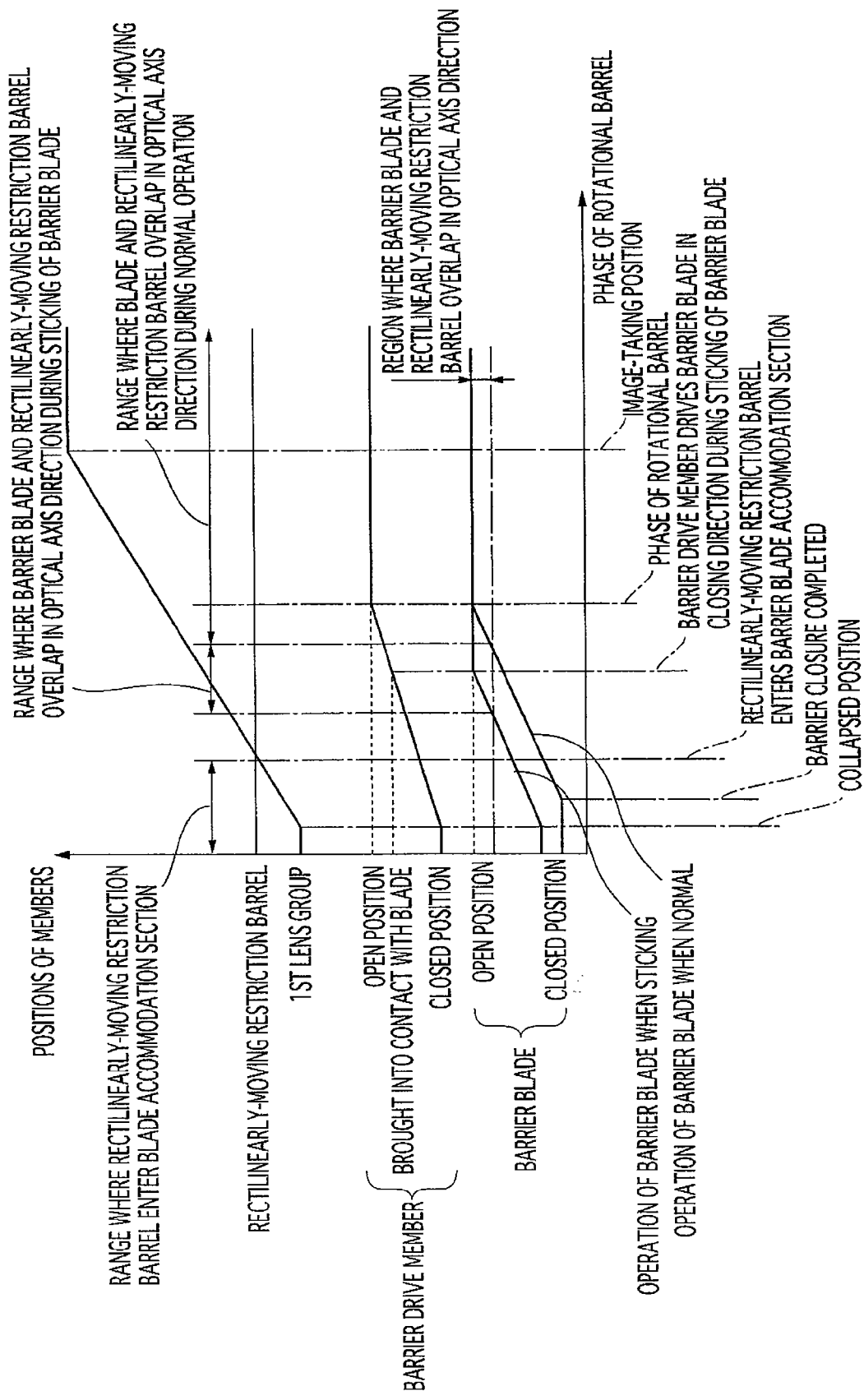
FIG. 7 is a timing diagram useful in explaining the operations of the rectilinearly-moving restriction barrel, a first lens group barrel, a barrier drive member, and the barrier blades, when the lens barrel assembly is switched from the collapsed position to the image-taking position.

FIG. 1 is an exploded perspective view of a lens barrel assembly including a lens barrel according to a first embodiment of the present embodiment. FIG. 2 is a cross-sectional view of the lens barrel assembly in an image-taking position. FIG. 3 is a partial enlarged view of FIG. 2. FIG. 4 is a cross-sectional view of the lens barrel assembly in a collapsed (standby) position. FIG. 5 is a partial enlarged view of FIG. 4. FIG. 6 is a view of the barrier blades in a state sticking to an open position due to presence of foreign matter during closing operation thereof. FIG. 7 is a timing diagram useful in explaining the operations of a rectilinearly-moving restriction barrel, a first lens group barrel, a barrier drive member, and the barrier blades, when the position of the lens barrel assembly is switched.

As shown in FIG. 1, the lens barrel assembly includes a first lens group barrel 11 that holds a first lens group 1, as the lens barrel according to the first embodiment of the present invention, and a second lens group barrel 12 is disposed on a side of the first lens group barrel 11 remote from an object. The first lens group barrel 11 and the second lens group barrel 12 are both retracted or extended in the optical axis direction according to an operation by a photographer.

A rectilinearly-moving restriction barrel (moving member) 13 is disposed on an inner peripheral side of the first lens group barrel 11, for restricting rotations of the first lens group barrel 11 and the second lens group barrel 12. The rectilinearly-moving restriction barrel 13 is provided with a groove 13a and through grooves 13b. The rectilinearly-moving restriction barrel 13 has arch-shaped portions 13c formed at respective leading ends of the through grooves 13b, for reinforcing the rigidity of the rectilinearly-moving restriction barrel 13.

A key (not shown) formed on the inner peripheral side of the first lens group barrel 11 is fitted in the groove 13a of the rectilinearly-moving restriction barrel 13, whereby the rotation of the first lens group barrel 11 is restricted. Further, follower pins 12a of the second lens group barrel 12 are fitted through the through grooves 13b of the rectilinearly-moving restriction barrel 13, whereby the rotation of the second lens group barrel 12 is restricted. It should be noted that the through grooves 13b of the rectilinearly-moving restriction barrel 13 are three through grooves disposed at equal circumferential intervals of 120°.

The rectilinearly-moving restriction barrel 13 has a rotational barrel 18 rotatably connected thereto. The inner periphery of the rotational barrel 18 is provided with first group cams 18a and second group cams 18b. The first group cams 18a of the rotational barrel 18 are engaged with respective first group follower pins 11a formed on the outer periphery of the first lens group barrel 11, and the second group cams 18b are engaged with the second group follower pins 12a formed on the outer periphery of the second lens group barrel 12, respectively.

As the rotational barrel 18 is rotated by an electric motor, not shown, the first lens group barrel 11 and the second lens group barrel 12 which are restrained from rotation by the rectilinearly-moving restriction barrel 13 are moved in the optical axis direction following the paths of the cam grooves.

Disposed at the leading end of the first lens group barrel 11 are a pair of the barrier blades 14, the barrier drive member 15 for driving the barrier blades 14, and a barrier cover 16 formed with an image-taking 16a.

The barrier blades 14, as shown in FIG. 6, are supported at the leading end of the first lens group barrel 11 in a manner rotatable about respective pivots 14c. The barrier blades 14 are fully closed in the collapsed state of the lens barrel assembly to cover the image-taking 16a, and are fully opened to open the image-taking 16a when shooting. In the vicinity of the pivot 14c of each of the barrier blades 14, there is formed a contact part 14b for contact with an associated contact part 15b of the barrier drive member 15.

The barrier drive member 15 is formed into a generally annular shape, and is rotatably supported at the leading end of the first lens group barrel 11. Further, as shown in FIG. 6, the barrier drive member 15 has a pair of cutouts 151 formed circumferentially apart from each other by 180°, and each of the contact parts 15b that comes into contact with the contact part 14b of the associated barrier blade 14 during rotation of the barrier drive member 15 is formed on a circumferentially-facing wall surface of the corresponding cutout 151.

Each barrier drive spring 17 is implemented by a tension coil spring in the present embodiment. The barrier drive spring 17 has one end thereof hooked to a spring hook part 14a formed on the base part of the contact part 14b of the associated barrier blade 14 and another end thereof hooked to a spring hook part 15c formed on the barrier drive member 15. The barrier drive springs 17 urge the barrier drive member 15 and the respective barrier blades 14 in a direction in which each of the contact parts 14b of the respective barrier blades 14 is brought into contact with the associated one of the contact parts 15b of the barrier drive member 15, whereby the rotation of the barrier drive member 15 and the opening/closing operation (pivotal motion) of each barrier blade 14 are interlocked with each other.

Now, a phase of the barrier drive member 15 in the state where the barrier blades 14 are fully open is referred to as the "barrier open phase", and a phase of the barrier drive member 15 in the state where the first lens group barrel 11 is retracted and the barrier blades 14 are fully closed is referred to as the "barrier closed phase".

As shown in FIG. 1, the barrier drive member 15 is formed with a cam surface 15d, and the rectilinearly moving cylinder 13 is formed with a cam surface 13d.

When the first lens group barrel 11 is retracted (the lens barrel assembly is collapsed), the cam surfaces 15d and 13d are brought into contact with each other to forcibly rotate the barrier drive member 15 to the "barrier closed phase" while progressively charging the barrier drive springs 17.

At this time, each of the barrier blades 14 performs a pivotal motion in the closing direction (closing operation) in accordance with the rotation of the barrier drive member 15. As a consequence, the barrier blades 14 are fully closed to cover the image-taking 16a.

On the other hand, when the first lens group barrel 11 is extended, the cam surfaces 15d and 13d in contact with each other are separated from each other, and the barrier drive member 15 rotates in a direction indicated by an arrow B to the "barrier open phase" while permitting the barrier drive springs 17 to progressively release the charged spring forces thereof.

At this time, each of the barrier blades 14 performs a pivotal motion in the opening direction (opening operation) in accordance with the rotation of the barrier drive member 15. As a consequence, the barrier blades 14 are fully opened to open the image-taking 16a.

Now, if the first lens group barrel 11 is retracted with the open barrier blades 14 restrained from closing (i.e. constrained from moving toward the closing position), the barrier drive member 15 rotates to the "barrier closed phase" while progressively charging the barrier drive springs 17. Further, if the restraint of the barrier blades 14 is released in this state, the barrier blades 14 perform a closing operation while progressively releasing the charged spring forces of the barrier drive springs 17.

If the barrier blades 14 are forcibly opened in the collapsed state of the lens barrel assembly, the barrier blades 14 perform an opening operation while progressively charging the barrier drive springs 17. Then, when the barrier blades 14 are released from the forcible opening, the barrier blades 14 perform a closing operation while progressively releasing the charged spring forces of the barrier drive springs 17.

Next, a description will be given of the operations of the barrier blades 14 and the rectilinearly-moving restriction barrel 13.

Referring to FIGS. 2 and 3, the first lens group barrel 11 and the second lens group barrel 12 are extended in the optical axis direction with respect to the rectilinearly-moving restriction barrel 13 to place the lens barrel assembly in the image-taking position, in which the second group follower pins 12a are at the respective front ends of the through grooves 13b formed through the rectilinearly-moving restriction barrel 13. The barrier blades 14 are retracted from the image-taking 16a to be placed in an open state, and are received in respective accommodation spaces C formed on the inner side of the barrier cover 16.

Referring to FIGS. 4 and 5, the first lens group barrel 11 and the second lens group barrel 12 are retracted in the optical axis direction with respect to the rectilinearly-moving restriction barrel 13 to be placed in a collapsed (standby) position, and the arch-shaped portions 13c formed at leading end portions of the rectilinearly-moving restriction barrel 13 protrude to the location of the barrier cover 16.

The barrier cover 16 is formed with cutouts 16c at respective locations corresponding to those of the arch-shaped portions 13c, whereby interference between the rectilinearly-moving restriction barrel 13 and the barrier cover 16 is prevented. At this time, the barrier blades 14 are in the closed position by the actions of the barrier drive member 15 and the barrier drive springs 17, to cover the image-taking 16a.

At this time, part of the arch-shaped portion 13c of each rectilinearly-moving restriction barrel 13 enters the accommodation space which was occupied by the barrier blades 14 when they ware in the image-taking position.

By the way, when the first lens group barrel 11 and the second lens group barrel 12 are retracted or collapsed to cause the barrier blades 14 to close, if the barrier blades 14 are hindered from moving due to biting of foreign matter, such as sand, there is a fear that the barrier blades 14 cannot be closed by only the spring forces of the barrier drive springs 17.

To overcome the inconvenience, in the present embodiment, as shown in FIG. 6, a wall surface of each cutout 151 circumferentially opposed to the associated contact part 15b of the same is formed as a contact part 15a for use in closing the associated barrier blade, whereby interference between the arch-shaped part 13c of the rectilinearly-moving restriction barrel 13 and the barrier blades 14 is prevented.

That is, if the barrier drive member 15 is rotated by the cam surface 13d of the rectilinearly-moving restriction barrel 13 in a direction indicated by an arrow A with the barrier blades 14 being incapable of being closed by only the spring forces of the barrier drive springs 17 due to sticking or fixing caused by the biting of foreign matter, the cutout 151 permits the barrier blades 14 not to be moved according to the action of the barrier drive member 15 to a fixed extent.

Then, before the arch-shaped portion 13c of the linearly-moving restriction barrel 13 is brought into contact with the associated barrier blade 14 in the open state, the contact part 15a of the barrier drive member 15 is brought into contact with the contact part 14b of the associated barrier blade 14b to thereby forcibly drive the barrier blade 14 in the closing direction. This prevents interference between the barrier blades 14 and the rectilinearly-moving restriction barrel 13.

FIG. 7 shows timing in which the first lens group barrel 11 and the rectilinearly-moving restriction barrel 13 move in the optical axis direction during the above-described series of operations thereof, and timing in which the barrier blades 14 and the barrier drive member 15 move to perform opening and closing operations.

As shown in FIG. 7, when the lens barrel assembly is changed over from the image-taking position to the collapsed position, the first lens group barrel 11 is retracted, and the cam surface 15d of the barrier drive member 15 is brought into contact with the cam surface 13d of the rectilinearly-moving restriction barrel 13, whereby the barrier drive member 15 is moved from the opening position to the closing position. Simultaneously with the motion of the barrier drive member 15, the barrier blades 14 start to be moved in the closing direction by the tensile forces of the barrier drive springs 17 from the open state thereof.

Then, in timing where the barrier blades 14 and the arch-shaped portions 13c of the rectilinearly-moving restriction barrel 13 cease to overlap in the optical axis direction, the arch-shaped portions 13c enter the associated accommodation spaces C for the barrier blades 14.

Further, in the case where the barrier blades 14 cannot be moved in the closing direction by the tensile forces of the barrier drive springs 17 alone due to the sticking or fixing of the barrier blades 14 in the open state, the contact part 15a of the barrier drive member 15 is brought into contact part 14b of the barrier blade 14, before the arch-shaped portions 13c of the rectilinearly-moving restriction barrel 13 enter the accommodation spaces C for the barrier blades 14, whereby the barrier blades 14 are forcibly driven in the closing direction.

This causes the barrier blades 14 and the arch-shaped portions 13c of the rectilinearly-moving restriction barrel 13 to enter the accommodation spaces C for the barrier blades 14 in timing in which the barrier blades 14 and the rectilinearly-moving restriction barrel 13 cease to overlap in the optical axis direction, whereby interference between the rectilinearly-moving restriction barrel 13 and the barrier blades 14 is prevented.

As described heretofore, in the present embodiment, by switching the lens barrel assembly from the image-taking position to the standby position, the arch-shaped portions 13c of the rectilinearly-moving restriction barrel 13 that relatively move in the optical axis direction closer to the barrier blades 14 enter the accommodation spaces C in which the barrier blades 14 are received during the open state of the barrier blades 14, when the barrier blades 14 are closed.

This makes it possible to make effective use of the accommodation spaces C for the barrier blades 14 which are relatively wide in area. Further, it is not required to receive the two barrier blades 14 in the open state in an overlapping manner, either, and hence it is possible to reduce the thickness of the accommodation spaces C in the optical axis direction. Therefore, it is possible to attain further reduction of the thickness and size of the lens barrel.

Further, even in the case where the barrier blades 14 suffers from sticking or fixing in the open state, it is possible to forcibly close the barrier blades 14 while permitting the same not to move according to the action of the barrier drive member to a fixed extent. Therefore, it is possible to collapse the lens barrel assembly (retract the lens group barrel) without causing damage thereto. Further, in the normal collapsed state of the lens barrel assembly, an accidental opening operation forcibly performed on the barrier blades 14 by the user can be permitted to a fixed extent until the contact part 15a of the barrier drive member 15 is brought into contact with the associated contact part 14b of the barrier blade 14.

Next, a lens barrel according to a second embodiment of the present invention will be described with referring to FIGS. 8 and 9.

Figure 8:
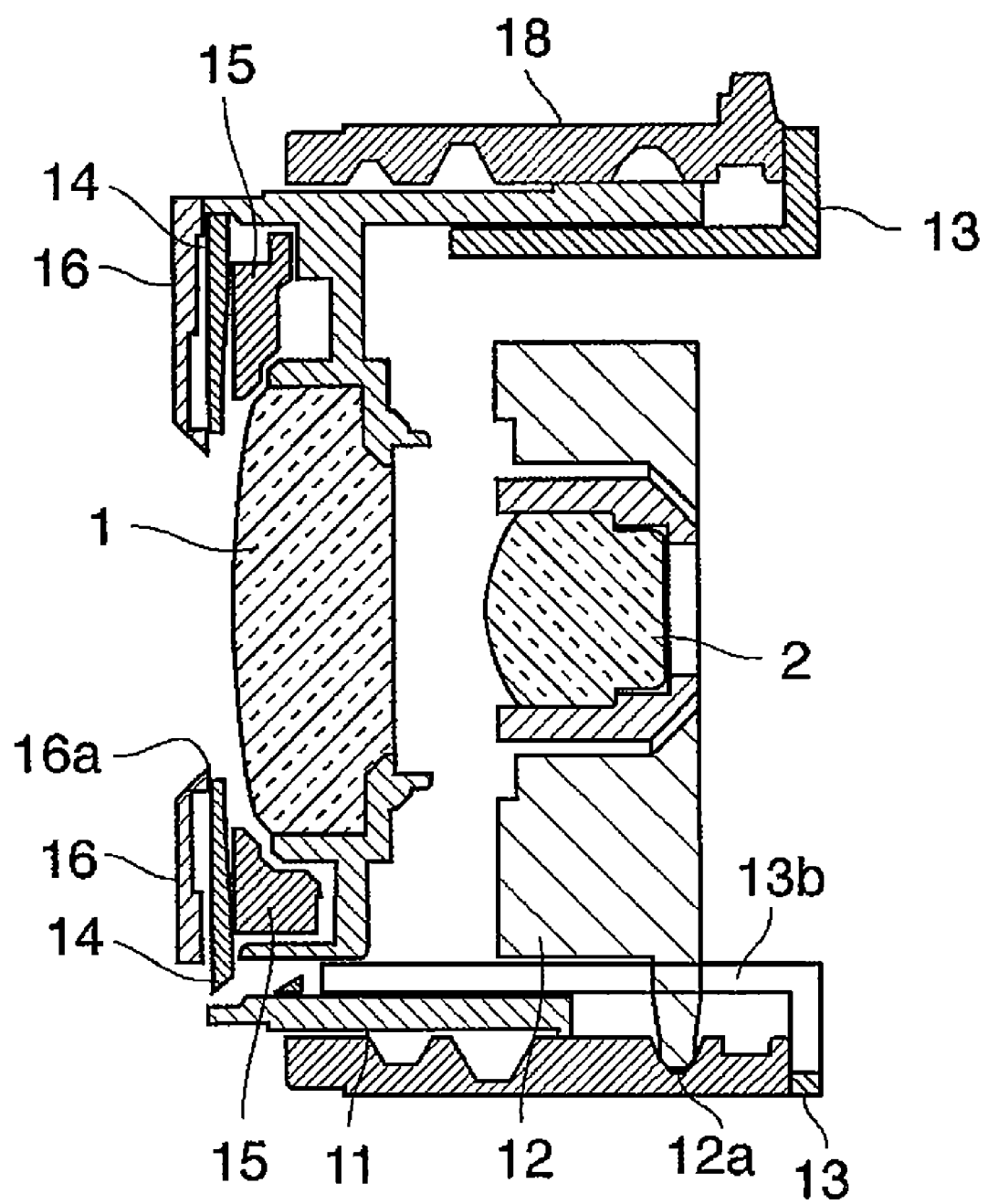
FIG. 8 is a cross-sectional view of a lens barrel assembly according to a second embodiment of the present invention.
Figure 9:
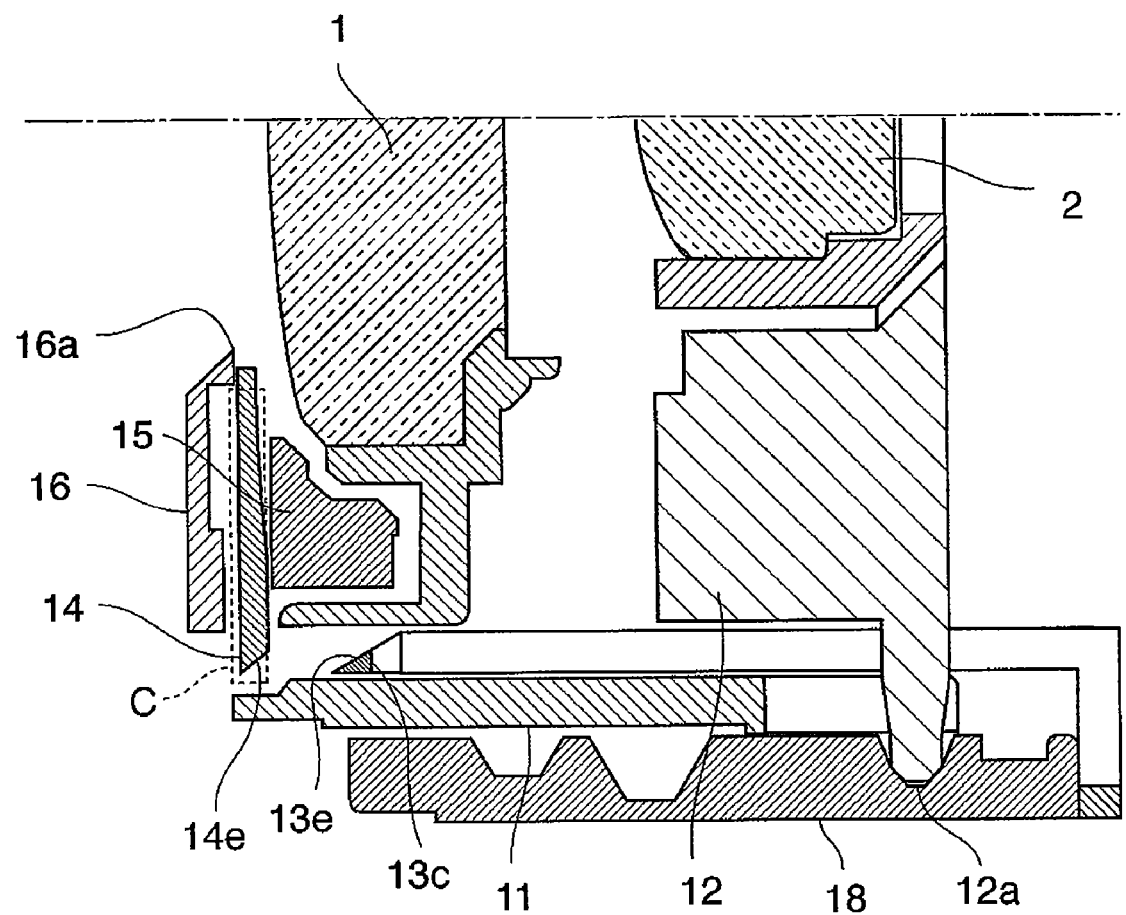
FIG. 9 is a partial enlarged view of FIG. 8.

FIG. 8 is a cross-sectional view of a lens barrel according to a second embodiment of the present invention. FIG. 9 is a partial enlarged view of FIG. 8. It should be note that component parts identical or similar to those of the first embodiment are designated by identical reference numerals, and duplicate description thereof is omitted.

In the lens barrel according to the second embodiment of the present invention, the countermeasure for solving the problem of a barrier blade 14 being incapable of being closed by the spring force of the associated barrier drive spring 17 due to sticking or fixing of the barrier blade 14 is different from that of the first embodiment described above.

That is, a tapered surface 13e is formed at the leading end of each arch-shaped portion 13c of the rectilinearly-moving restriction barrel 13. Further, each barrier blade 14 is formed with a tapered surface 14e at a location corresponding to the tapered surface 13e of the arch-shaped portion 13c.

In the case where a barrier blade 14 surfers from sticking or fixing in the open state and is incapable of being closed only by the spring force of the associated barrier drive spring 17, similarly to the first embodiment, the barrier blade 14 is permitted not to be moved by the action of the barrier drive member 15 to a fixed extent.

Then, when the collapsing action proceeds to cause the arch-shaped portion 13c of the rectilinearly-moving restriction barrel 13 to enter the respective accommodation spaces C for the barrier blades 14, the tapered surfaces 13e of the arch-shaped portions 13c are brought into contact with the tapered surfaces 14e of the barrier blades 14, respectively, whereby the barrier blades 14 are pushed in the closing direction by a kind of wedge effect. This causes the barrier blades 14 to be forcibly moved in the closing direction.

As described heretofore, in the present embodiment, the rectilinearly-moving restriction barrel 13 entering the accommodation spaces C for the barrier blades 14 forcibly cause a barrier blade suffering from sticking or fixing to be driven in the closing direction, whereby the lens barrel assembly can be collapsed (the lens group barrel can be retracted) without breaking or causing damage thereto.

It should be noted in the normally collapsed state, an accidental forcible opening operation performed on the barrier blades 14 by the user can be permitted to a fixed extent until the tapered surfaces 13e of the rectilinearly-moving restriction barrel 13 are brought into the tapered surfaces 14e of the barrier blades 14. The other constructions and advantageous effects of the present embodiment are the same as described as to the first embodiment.

It should be noted that the respective constructions of the image-taking, the barrier blades, the accommodation spaces, the moving member, the barrier drive member, etc. are not limited to those described hereinabove, but they can be modified as deemed appropriate insofar as they do not depart from the subject matter of the present invention.

For example, in the above-described embodiments, as the moving member that enters the accommodation spaces C for the barrier blades, the rectilinearly-moving restriction barrel 13 is shown by way of example, but the moving member is not limited to this. The same advantageous effects as descried above can also be obtained e.g. by employing the second lens group barrel 12, the rotational barrel 18, a flexible printed circuit, or a linearly moving guide member, such as a guide bar, which guides the lens group in the optical axis direction, as the moving member.

While the present invention has been described with reference to exemplary embodiments, it is to be understood that the invention is not limited to the disclosed the embodiments. The scope of the following claims is to be accorded the broadest interpretation so as to encompass all such modifications and equivalent structures and functions.

This application claims the benefit of Japanese Patent Application No. 2006-208648, Jul. 31, 2006 which is hereby incorporated by reference herein in its entirety.

What is claimed is:

1. A lens barrel comprising:
   a barrier blade adapted to openably cover an image-taking aperture, said barrier blade being adapted to be moved in a storage space in an open state of said barrier blade corresponding to an image-taking position of the lens barrel; and
   a moving member including a leading end, said moving member being adapted to relatively move closer to said barrier blade in an optical axis direction when said barrier blade is switched from the open state corresponding to the image-taking position of the lens barrel to a closed state corresponding to a standby position of the lens barrel, whereby said leading end enters the storage space when said barrier blade is in the closed state.

2. A lens barrel as claimed in claim 1, wherein said barrier blade comprises a plurality of barrier blades, and the storage space comprises a plurality of storage spaces provided in association with said barrier blades, respectively.

3. A lens barrel as claimed in claim 1, including a barrier drive member adapted to move between an opening position and a closing position to drivingly open and close said barrier blade, to thereby switch the lens barrel between the image-taking position and the standby position, wherein when said barrier drive member moves from the opening position to the closing position, said barrier drive member is brought into contact with said barrier blade before said moving member is brought into contact with said barrier blade, to thereby drive said barrier blade in a closing direction.

4. A lens barrel as claimed in claim 1, wherein said moving member including a leading end that is brought into contact with said barrier blade in the open state to thereby drive said barrier blade in a closing direction, when the lens barrel is switched from the image-taking position to the standby position.

5. A lens barrel as claimed in claim 1, wherein the lens barrel is a retractable lens barrel that is driven by an electric motor.

6. A lens barrel as claimed in claim 1, wherein said moving member is a linear guide member that guides a lens group in the optical axis direction when the lens group is driven for zooming or focusing.

7. A lens barrel as claimed in claim 6, wherein said guide member is a guide bar.

8. A lens barrel as claimed in claim 4, wherein said leading end of said moving member and a corresponding portion of said blade member with which said leading end is brought into contact are formed with tapered surface, respectively.

* * * * *